(12) United States Patent
Loeb et al.

(10) Patent No.: US 7,797,231 B1
(45) Date of Patent: Sep. 14, 2010

(54) METHODS AND SYSTEMS FOR FACILITATING ONE-TIME CONSUMER LOANS ARISING FROM DECLINED CREDIT CARD TRANSACTIONS

(75) Inventors: Michael R. Loeb, Manhattan, NY (US); Edward J. McCabe, Yonkers, NY (US); John F. Rovegno, Stamford, CT (US); Richard I. Vogel, Stamford, CT (US)

(73) Assignee: Loeb Enterprises, LLC., New York, NY (US)

( * ) Notice: Subject to any disclaimer, the term of this patent is extended or adjusted under 35 U.S.C. 154(b) by 0 days.

(21) Appl. No.: 11/895,945

(22) Filed: Aug. 28, 2007

Related U.S. Application Data (60) Provisional application No. 60/840,598, filed on Aug. 28, 2006.

(51) Int. Cl.
*G06Q 40/00* (2006.01)
(52) U.S. Cl. .............................. 705/38; 705/35; 705/39
(58) Field of Classification Search .................. None
See application file for complete search history.

(56) References Cited

U.S. PATENT DOCUMENTS

| | | | |
|---|---|---|---|
| 2002/0026396 A1* | 2/2002 | Dent et al. .................. 705/35 |
| 2002/0077964 A1* | 6/2002 | Brody et al. .................. 705/38 |
| 2002/0107793 A1* | 8/2002 | Lee .............................. 705/40 |
| 2002/0156723 A1* | 10/2002 | Lilly et al. .................... 705/38 |
| 2003/0158811 A1* | 8/2003 | Sanders et al. ................ 705/39 |
| 2004/0254848 A1* | 12/2004 | Golan et al. .................. 705/26 |
| 2005/0289048 A1* | 12/2005 | Kwan .......................... 705/39 |

\* cited by examiner

*Primary Examiner*—Hani Kazimi
*Assistant Examiner*—John D Scarito (57) ABSTRACT

Methods and systems are provided for offering loans to users at a point-of-purchase transaction. Such loans are typically offered upon the decline of a user-tendered payment, for example of a credit or debit card or check, and typically at a retail physical location point of sale and/or at a retail website point of sale. The loan offer process is desirably integrated with the merchant's payment processing system. Term sets can be pre-established between the merchant and the loan offerer. Processing to determine whether to offer a loan and under which set of terms is desirably automated such that the decision can be made in substantially real time to motivate the completion of what might constitute an otherwise failed transaction.

16 Claims, 5 Drawing Sheets

METHODS AND SYSTEMS FOR FACILITATING ONE-TIME CONSUMER LOANS ARISING FROM DECLINED CREDIT CARD TRANSACTIONS

CROSS-REFERENCE TO RELATED APPLICATIONS

This is a non-provisional application of provisional application Ser. No. 60/840,598 filed Aug. 28, 2006 entitled "Methods and Systems for Facilitating One-Time Consumer Loans Arising from Declined Credit Card Transactions", by Michael R. Loeb, Edward J. McCabe, Richard I. Vogel and John F. Rovegno, which application is incorporated herein by reference in its entirety.

FIELD OF THE INVENTION

The present invention relates generally to financial and data transaction methods and systems and more specifically to methods and systems for facilitating point-of-purchase transactions responsive to user payment decline or error.

BACKGROUND OF THE INVENTION

Credit cards are the most popular online payment option, accounting for more than 90% of all transactions. While the credit card option provides valuable benefits for both the retailer and consumer, a significant number of transactions fail during the credit approval process due to reasons such as card distress, atypical card usage or spending above a periodic limit; this error rate may be as high as 20%.

While the monitoring of accounts for atypical spending and enforcement of credit limits protect the issuer and cardholders against fraud and limit lender risk, the resulting rejections lead to a high rate of purchase abandonment. These gating systems inevitably reject a large number of guileless consumers that would settle their debt per their contractual obligations. A good consumer demonstrating considered intent to execute a transaction could verify their account information, or enter a new credit card number, complete the transaction and merchants would not suffer a loss in sales due to credit card declines. In reality, the inconvenience of providing the card information, together with a potential negative bias formed against the retailer communicating the rejection results in significant lost sales as consumers leave sites rather than attempt their purchase a second or third time, perhaps with a different card. By some estimates, out of the 20% of rejected transactions, half are not completed. As the company has already invested considerable marketing resources to obtain and convert the consumer, these failed transactions result in increased costs and reduced revenue.

The present inventors have recognized that a need exists to provide additional payment solutions that address this problem of purchase abandonment, thus improving consumer transaction completion rates, lowering merchant consumer acquisition costs and bolstering merchant margins.

SUMMARY OF THE INVENTION

According to one embodiment, systems, methods and a computer program product are provided directed to extending users one-time point-of-purchase loans, sometimes referred to herein as "snap-credit" loans. Point-of-purchase loans represent an alternative payment option, offered to users in real-time, in response to the user's primary payment choice, such as a credit card, being declined during a point-of-purchase transaction.

The invention provides significant benefits and advantages to both merchants and customers. By providing a one-time point-of-purchase consumer loan as a payment option that requires minimal additional user engagement for approval and is positioned positively in the instance of a primary payment option decline, the invention enables merchants to complete a large number of transactions that would have previously been abandoned.

DESCRIPTION OF THE DRAWING FIGURES

These and other objects, features and advantages of the invention will be apparent from a consideration of the following Detailed Description Of The Invention considered in conjunction with the drawing Figures, in which.

DETAILED DESCRIPTION OF THE PREFERRED EMBODIMENTS

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention and are considered to be within the understanding of persons of ordinary skill in the relevant art.

Various descriptions of the structure and function of the embodiments is provided in this patent. However, as is understood by those skilled in the art, the performance of a given functionality may be distributed among one or more components, and conversely, multiple structures may be required to achieve a desired functionality. While the detailed descriptions herein have been provided with respect to certain allocations of functionality and structure to various items (such as elements of a block diagram or flowchart) the underlying inventions herein should not be limited to the allocation of those structures, functions, diagrammatic representations or labeling selected for expository convenience herein.

References herein to "Snap Credit" refer to the facilitation of a merchant's offer to make a loan, in real-time, to a consumer at a point of sale. As used herein, "products" includes both products and services. As used herein, "user" refers to both customers and potential customers.

Examples herein are illustrative and non-limiting. Like elements and steps as between Figures are indicated by like reference numerals.

I. Overview of the Point-of-Purchase Transaction System

Methods and systems provided herein extend users one-time point-of-purchase loans as an alternative payment option in response to a user's credit being declined during a point-of-purchase transaction. As is well known, point-of-purchase transactions occur numerous times each day and a percentage of them are not executed for various reasons, primary among them being credit decline, processing errors and abandonment. As will become apparent, these and other drawbacks are overcome by the present invention by offering the user a one-time point-of-purchase loan, referred to by the inventors as a "snap credit" loan, as an alternative payment option requiring minimal additional user engagement for approval, positioned positively in the instance of a payment decline.

To evaluate the risks associated with offering and collecting point-of-purchase (snap-credit) user loans, various inputs are taken into consideration by a loan analysis module. In some embodiments, these inputs include information accessible via credit reporting agencies, including, for example, a user's past credit history and purchase related data which may include product selection, merchant type, user purchase history with the merchant and time of day. In some embodiments, the loan analysis module may utilize credit bureau reports together with other credit reporting agency "marketing" reports. The marketing reports advantageously provide an evaluation of a user's likelihood of default based purely on publicly available, non-individualized information. Based on the afore-mentioned inputs, the loan analysis module can make a determination regarding whether a one-time point-of-purchase consumer loan is warranted for a given point-of-purchase transaction. A merchant may then be apprised of the determination.

In one aspect, it is contemplated to offer one-time point-of-purchase consumer loans under different circumstances. For example, a one-time point-of-purchase consumer loan may be offered in response to a credit card decline, within the merchant's online payment processing path. Other circumstances include, for example, purchase abandonment, where a user has completely abandoned a purchase by leaving the merchant's website, and where an loan offer is provided subsequently via a different medium, such as by e-mail or outbound phone call, or a circumstance in which the stored value or pre-paid card a user is using to make a purchase does not hold enough value to complete the entirety of a purchase.

According to another aspect, in a pre-operational stage, the snap-credit system generates and stores an association of one-time point-of-purchase consumer loan offerings with corresponding consumer credit pre-screen filtering criteria. The association may be many-to-one. That is, whenever a consumer passes a promotional check, the underlying pre-screen filtering criteria used may have multiple loan options or types associated with it. In operation, the managing entity selects the most appropriate loan option from among the choices provided.

According to a further aspect, in the case where a managing entity evaluates a user and cannot definitively link one user record with the purchaser, the system invokes a process of requesting more information of the user in order to further isolate their records and potentially settle upon a record of sufficient quality to offer a loan.

The present invention also relates to computer readable media that include program instruction or program code for performing various computer-implemented operations based on the methods and processes of the invention. The program instructions may be those specially designed and constructed for the purposes of the invention, or they may be of the kind well-known and available to those having skill in the computer software arts. Examples of program instructions include for example machine code, such as produced by a compiler, and files containing a high level code that can be executed by the computer using an interpreter.

II. System Overview

Figure 1A:
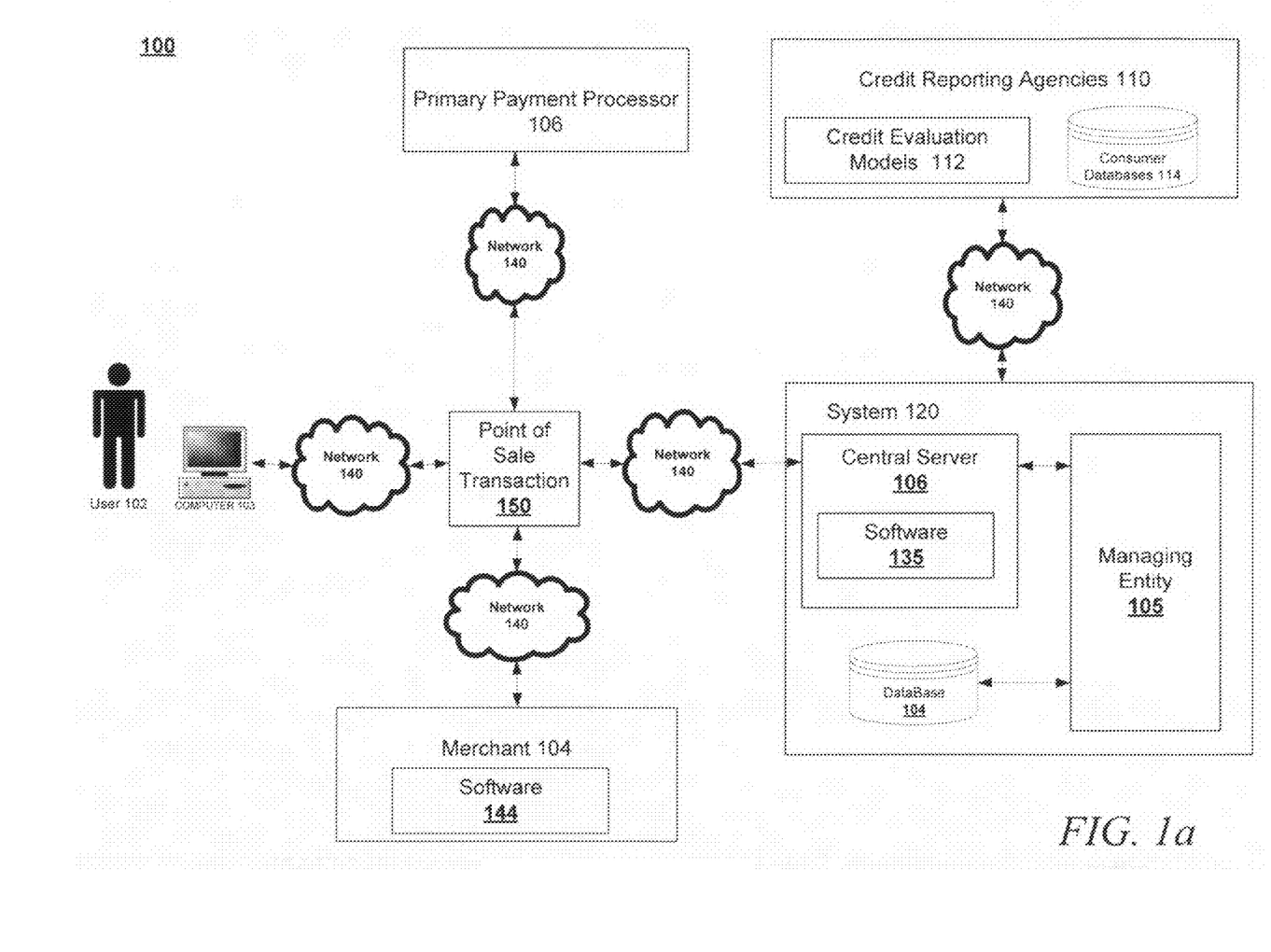
FIGS. 1a & 1b are system block diagrams in accordance with different embodiments of the present invention.

FIG. 1a illustrates an exemplary system environment 100 in which the features and principles of the invention may be implemented. As illustrated in FIG. 1, the system environment 100 includes a user 102, a merchant 104 including appropriate operating software 144, a primary payment processor 106 (e.g., Paymentech, Litle & Co.), a point-of-purchase loan facilitator system 120 managed by a loan facilitator managing entity 105.

User 102 (also referred to as a customer or potential customer) interfaces with the merchant 104 and system 120 via a computer 103. Typically, the computer 103 a display, such as a CRT or flat panel display, some input device such as a keyboard, and optionally a mouse or other pointing device, and may optionally include an imaging unit to image the user 102. Additional devices such as a printer, such as to provide a permanent transaction record or to print images regarding proffered goods or services may be included. Similarly, a facsimile machine may be included, and may be connected to a telephone system for effective communication. Again, any type of human/machine interface consistent with achieving the goals and functionalities of the instant invention may be utilized with this system.

The point-of-purchase loan facilitator system 120 comprises a central server 108 coupled to a database 109, each of which are coupled to a point-of-purchase loan facilitator managing entity 105. Typically, the database 109 is a locally resident database, such as the system's own database. It should be understood that a locally resident database refers to any database configured for any access by the point-of-purchase loan facilitator system 120, not necessarily one that is located at the loan facilitator's site. Database 109, if a resident database, may handle matters requiring relatively quicker response, such as a locally stored list of users unworthy of credit due to past delinquence. In one embodiment, database 109 stores information related to: a user's attempted purchase, decline codes, past declined purchases, purchases that have been contested by a purchaser and user identifications for those users who have defaulted on store credit in the past.

Figure 1B:
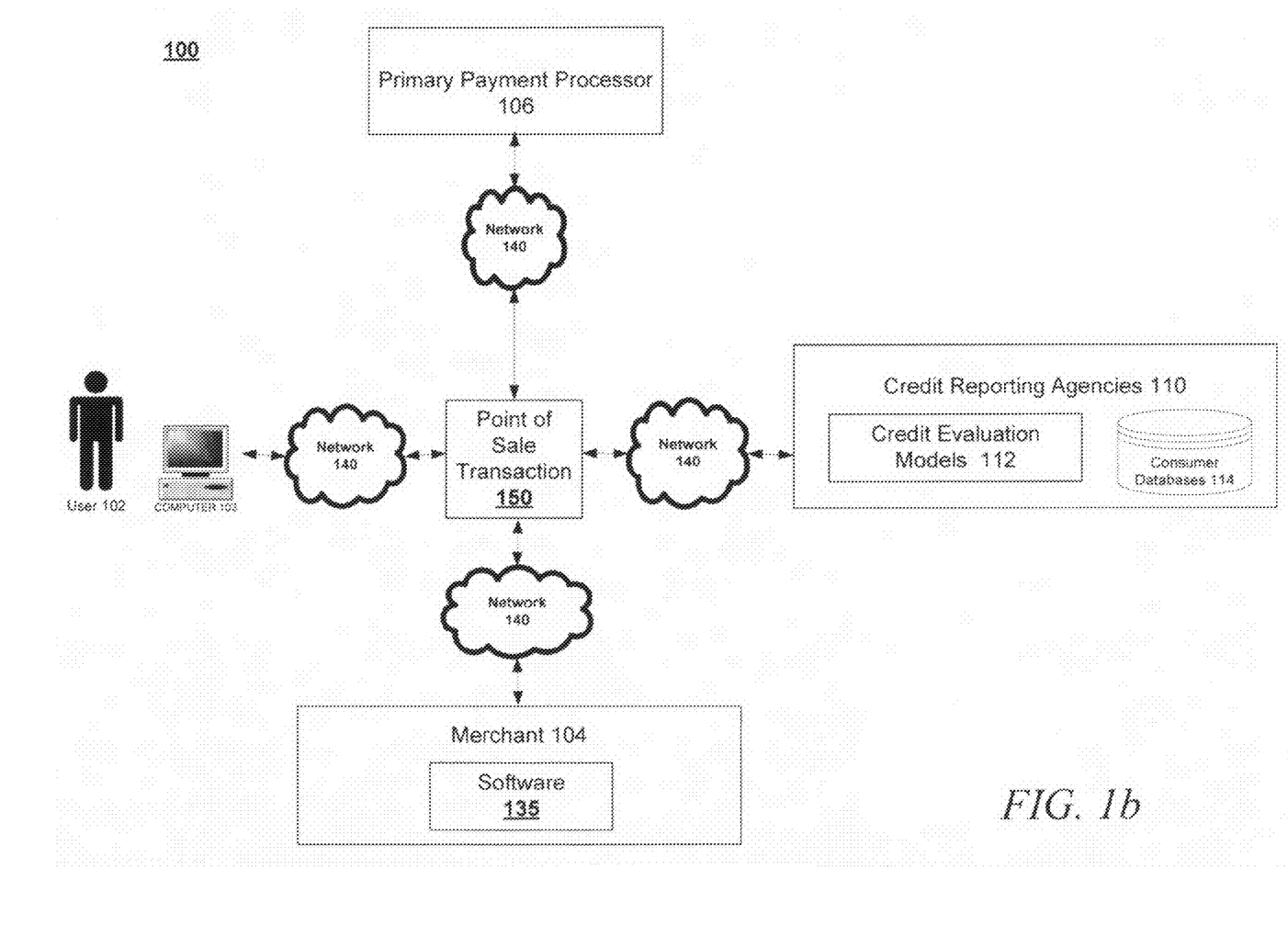
Figure 2:
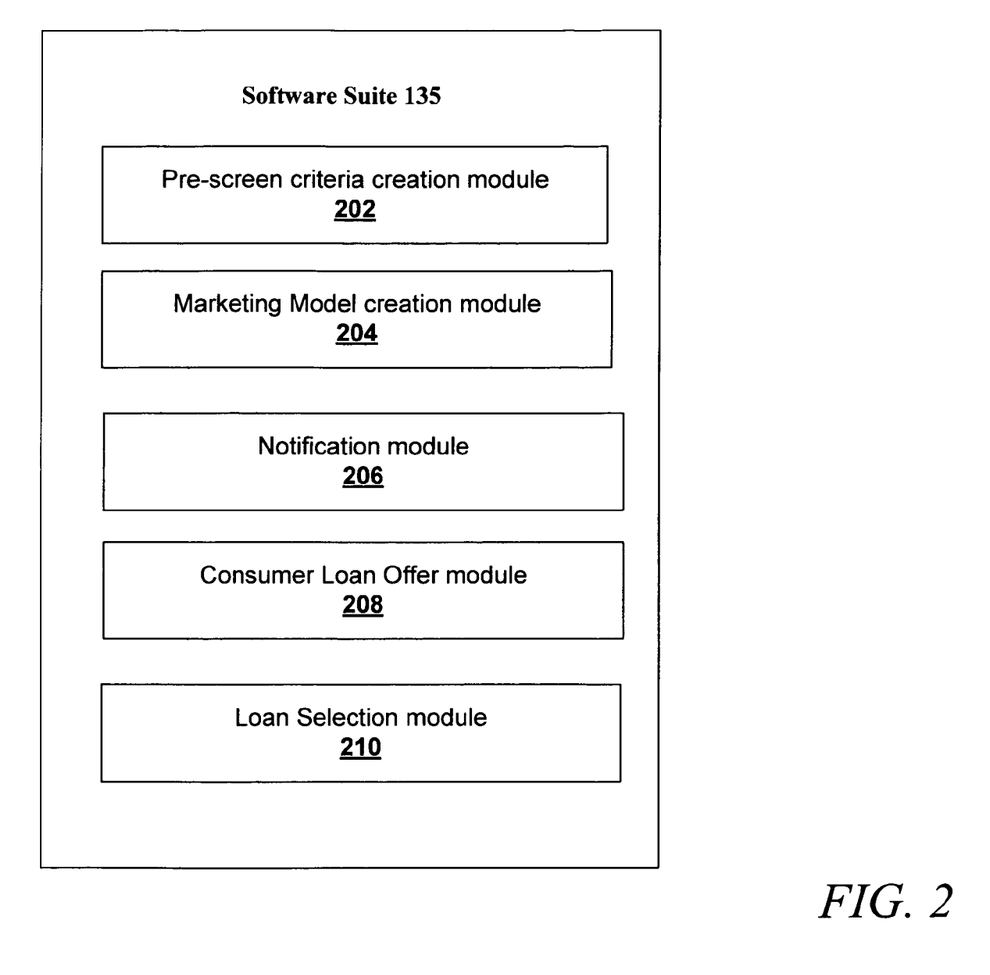
FIG. 2 is an expanded version block diagram of an exemplary embodiment of software suite 135 as shown in FIGS. 1a and 1b.

With reference now to FIG. 2, is an expanded version block diagram of an exemplary embodiment of software suite 135 as shown in FIGS. 1a and 1b. Software suite 135 includes a pre-screen criteria creation module 202 for creating at least one set of pre-screen criteria that define certain levels of qualification for making one-time point-of-purchase consumer loans; a marketing model creation module 204 for evaluating users for credit-worthiness based upon non-consumer specific data; a user payment notification module 206 for receiving notice that a user payment to the merchant 104 for a product has been declined; a user loan offer module 208 for offering the user 102 an option to qualify for a loan to complete an incomplete purchase transaction; a loan selection module 210 for selecting an appropriate one-time point-of-purchase consumer loan from among a set of pre-established one-time point-of-purchase consumer loans.

Referring again to FIG. 1a, the exemplary system environment 100 further includes one or more credit reporting agencies 110 in communication with the point-of-purchase loan facilitator system 120. The credit reporting agencies 110 are configured to provide general and specific consumer credit information to the point-of-purchase loan facilitator system 120.

User 102, merchant 104, primary payment processor 106 and system 120 are shown to be engaged in a typical point-of-purchase transaction 150 which, in the present embodiment, is conducted electronically over a network 140, such as the Internet. In other embodiments, the point-of-purchase transaction 150 is performed at a retail site with the user 102 and merchant 104 physically present.

Secured communications are preferably utilized within some or all of the system. For example, encrypted messages or data may be utilized, such as when transmitting raw or analyzed data from, to or between the credit reporting agencies 110 and the point-of-purchase loan facilitator system 120. Further, security qualification or entitlement restrictions may be utilized such as to the entire system, or parts of the system, such as databases.

Sources of input information for the system 120, such as credit evaluations and other data for the point-of-purchase loan facilitator system 120 may come from any or all of block 110, or other databases. It will be understood by those skilled in the art that the number of users 102, primary payment processors 106 and credit reporting agencies 110 has been simplified for expository convenience, and is not intended to be a limitation on the scope or teaching of the invention.

III. Flow Diagram Depicting Point-of-Purchase Transaction Process

Figure 3:
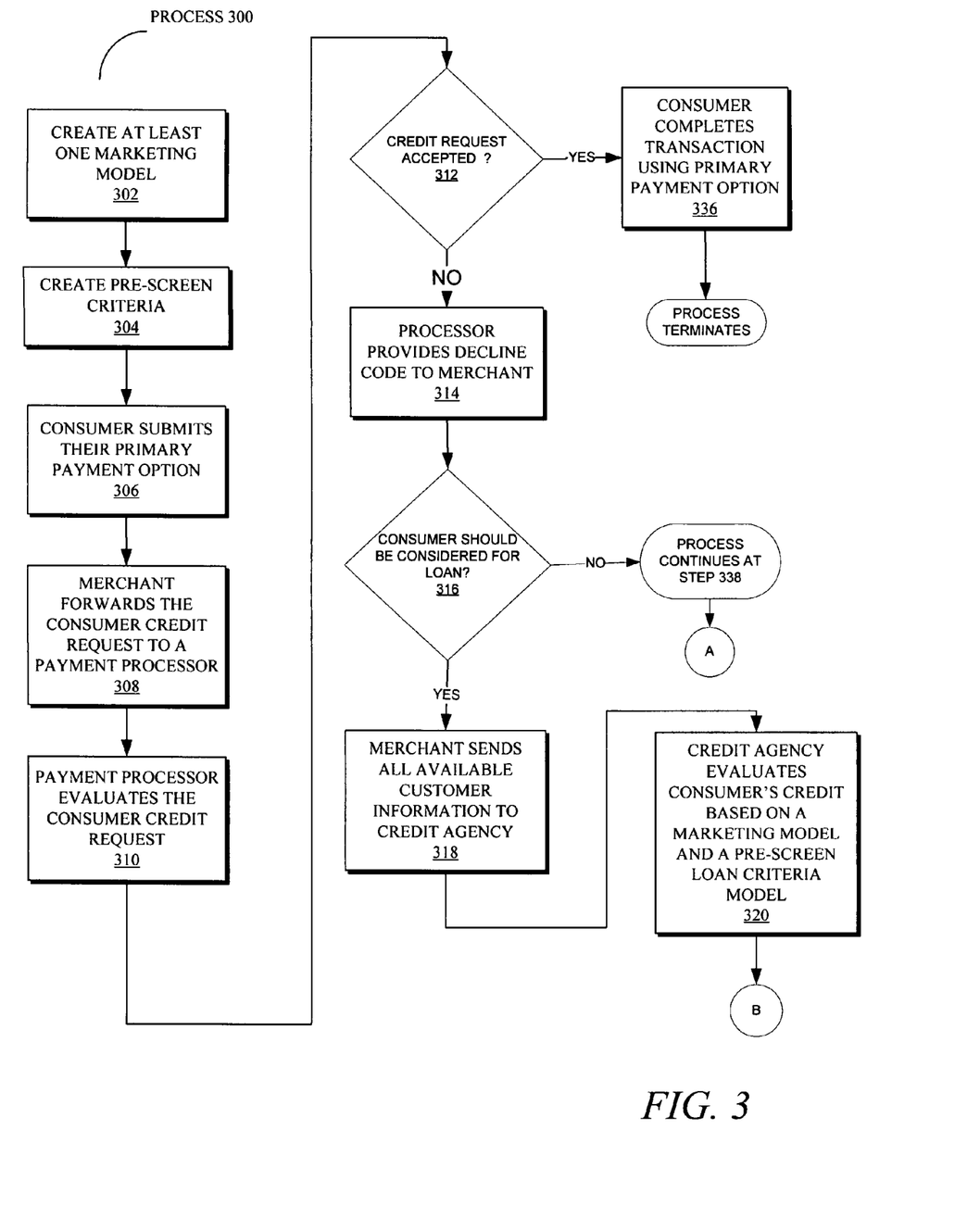
FIG. 3 is a block diagram showing a process in accordance with the invention by which a user is offered a one-time loan for an amount of their purchase.

With reference now to FIG. 3, there is shown a process 300 for offering a user a one-time point-of-purchase consumer loan as an alternative payment option in response to a user's credit being declined during a point-of-purchase transaction, according to one exemplary embodiment. The process 300 is described in connection with the exemplary point-of-purchase transaction 150 illustrated in FIGS. 1a and 1b.

Pre-Operational Stage

At step 302, the merchant 104, managing entity 105 and credit reporting agency 110 create a marketing model that evaluates consumers for credit-worthiness based upon non-consumer specific data. Non-consumer specific data is considered to be "marketing" data, such as, for example, average credit scores within a user's geographic area, average age of automobile within the user's geographic area, the total amount of a purchase, the user's history with a merchant, product mix, type of products, time of day of purchase, IP address, the type of merchant and an amount of time the consumer spent considering a product. The reader will be aware of other relevant criteria that may be considered in addition to those explicitly recited.

At step 304, the merchant 104, and the managing entity 105, acting as the merchant's agent or partner, create at least one set of pre-screen criteria that define certain levels of qualification for making one-time point-of-purchase consumer loans to users. The pre-screen criteria are developed with the assistance of a credit reporting agency 110. Pre-screen credit checks, otherwise referred to as "promotional" credit checks, are well known in the art, and provide merchants, marketers and banks the ability to perform a form of soft credit check on a user. The credit check is considered "soft" in the sense that it does not involve evaluating a user's credit report history. Instead, the party performing the soft credit check establishes a set of criteria by which a user(s) will be judged, with the help of a credit reporting agency. This set of criteria is established, approved and fixed prior to evaluating any user(s). Implementing these pre-screen credit checks involves the step of a credit reporting agency evaluating the user(s) against a defined pre-screen model and based on the evaluation, passing back to the party running the soft check, only the names of those users that passed the credit check. Then, in accordance with the law, the party running the check is then obliged to make a "firm" offer of credit to those users who pass the pre-screen credit check.

Operational Stage

At step 306, user 102, wishing to complete the point-of-purchase transaction 150 (see FIG. 1), submits the user's primary payment option at a commercial website hosted by the merchant 104. Typical primary payment options include, for example, a credit card, debit card, check, pre-paid card, stored-value card, funds transfer or other primary payment modalities which are well known to the reader.

At step 308, the merchant 104 forwards the user credit request to the payment processor 106.

At step 310, the payment processor 106 evaluates the user credit request and sends a credit evaluation to the merchant 104 indicating whether to accept or reject the primary payment option submitted by the user 102. Of particular interest is the case where the payment processor 106 rejects the user's primary payment option to complete the point-of-purchase transaction 150 based on the credit evaluation.

At step 312, a determination step, it is determined whether the credit request is accepted. In the case where the credit request is accepted, the process continues at step 336, otherwise, the process continues at step 314.

At step 314, the merchant 104 is provided with a notification from the payment processor 106 that the user primary payment option has been declined together with a reason code associated with the decline, which gives the merchant 104 an explanation for the decline.

At step 316, a determination step, merchant 104 decides whether the user 102 should be considered for a one-time point-of-purchase consumer loan, based upon the reason code provided with the decline notification from the primary payment processor 106. In the case in which merchant 104 decides not to consider the user 102 for a one-time point-of-purchase consumer loan, based on the reason code, the process continues at step 338. Otherwise, the process continues at step 318.

At step 318, the merchant 104 sends all of the available user information to the credit reporting agency 110 for evaluation according to the previously developed marketing model and pre-screen model (see steps 302 and 304). The available user information comprises at least one of: a name, an address, a billing and shipping address, a phone number, a social security number, an email address, the amount of the declined purchase, user purchase history data and other information related to the user's primary payment option.

At step 320, the credit reporting agency 110 evaluates the user's credit using the previously created marketing model and pre-screen model. In one embodiment, at least one marketing model is used simultaneously with using at least one set of pre-screen loan criteria.

At step 322, a determination step, the credit reporting agency 110 determines whether the user's credit qualifies the user to receive a one-time point-of-purchase consumer loan. If the user 102 qualifies at this step, the process continues at step 324, otherwise, the process continues at step 338.

At step 324, the credit reporting agency 110 returns a positive result for the user 102 to the merchant 104.

At step 326, the merchant 104 together with managing entity 111, chooses a loan to offer the loan approved user 102.

At step 328, the merchant 104 and managing entity 105 extend a communication to the user indicating that the user is pre-approved to receive a one-time consumer loan to complete their purchase.

At step 330, the user 102 reviews the one-time point-of-purchase consumer loan agreement.

At step 332, a determination step, if the user 102 accepts the terms of the one-time point-of-purchase consumer loan offer the process continues at step 334, otherwise if the user 102 rejects the terms, the process terminates.

At step 334, the one-time point-of-purchase consumer loan is issued to the user 102.

At step 336, the transaction is completed, with the snap credit loan satisfying the customer's payment requirement, and the process terminates.

At step 338, the merchant 104 communicates to the user 102 the merchant's standard rejection messaging, which generally requests that the user check their credit card number and try their purchase again, without the offer of a loan, and the process terminates.

FIG. 1b illustrates another exemplary system environment 200 of the invention, according to one embodiment, in which the merchant 104 is in direct communication with the credit reporting agencies 110. In this case, the point-of-purchase loan facilitator system 120 (not shown) is not involved as an active partner of merchant 104, as described above in the immediately preceding embodiment. Instead, the point-of-purchase loan facilitator system 120 assists the merchant 104 in setting up the communication channels required to establish the direct access with the credit reporting agencies 110.

In yet another embodiment, instead of using the marketing model as an adjunct to the pre-screen credit filters, the credit reporting agency 110 uses the response from the marketing model as a pre-filter for selecting the most appropriate pre-screen, in those cases where there may be multiple levels of pre-screens designed and housed at the reporting agency. One motivation for using the marketing model as a pre-filter is to reduce costs. That is, an unfavorable marketing answer precludes running unnecessary pre-screens on a user. Another motivation for using the marketing model is that pre-screens, used in isolation, only return positive answers without any insight into payment history. By running a marketing model first, as a pre-filter, the merchant and the snap credit system gain valuable insights into choosing the most appropriate pre-screen based upon marketing related factors, correlated with risk.

In still yet another embodiment, in the case in which the user does not pass an initial pre-screen, they are automatically screened against a second, lesser set of criteria. If declined again, the user might be pre-screened against a tertiary set of pre-screen criteria, and so on until it is determined that a user is not credit-worthy. As described, the pre-screen loan criteria is hierarchically organized, wherein said hierarchy ranges from a most stringent set of criteria to a least stringent set of criteria.

In another embodiment, a user is selectively evaluated for a point-of-purchase loan dependent upon the particular decline code received from the credit evaluation agency. For example, a user may be considered for a point-of-purchase loan in those cases where a returned decline code is within any of categories {1,3,4, and 7} and will not be offered a point-of-purchase loan in those cases where the returned decline code is within any of categories {2,5,6,8,9 and 10}.

In one embodiment, a user's credit worthiness is evaluated in real-time in response to the user's primary payment option being denied. For example, steps 306 through 338, as described above in relation to process 300, i.e., the operational stage, is performed in real-time to provide a user with a substantially instantaneous offer to consider a point-of-purchase loan in those cases where the user's credit has been approved.

There have thus been provided new and improved methods and systems for offering loans to users at a point-of-purchase transaction. Such loans are typically offered upon the decline of a user-tendered payment, for example of a credit or debit card or check, and typically at a retail physical location point of sale and/or at a retail website point of sale. The loan offer process is desirably integrated with the merchant's payment processing system. Term sets can be pre-established between the merchant and the loan offerer. Processing to determine whether to offer a loan and under which set of terms is desirably automated such that the decision can be made in substantially real time to motivate the completion of what might constitute an otherwise failed transaction. The invention has applications in the fields of retail sales, financial lending and transaction payment processing.

While the invention has been shown and described with respect to particular embodiments, it is not thus limited. Numerous modifications, changes and enhancements will now be apparent to the reader.

What is claimed is:

1. A method for making a loan offer to a user in response to a failed point-of-purchase transaction, the method comprising:

(a) receiving at a merchant computer via an electronic communication medium a primary payment option as a request from a user to complete a point-of-purchase transaction;

(b) forwarding from the merchant's computer to a payment processor the user's request to complete the point-of-purchase transaction;

(c) evaluating the user's request at the payment processor to determine whether the user's request is accepted or declined;

(d) determining by the payment processor that the user's request to complete the point-of-purchase transaction is declined;

(e) receiving at the merchant's computer a decline notification from the payment processor indicating that the user's request to complete the point-of-purchase transaction has been declined;

(f) the merchant informing the user that the point-of-purchase transaction has been declined;

(g) the user abandoning the point-of-purchase transaction;

(h) determining, by the merchant's computer, whether to consider the user for a one-time point-of-purchase loan;

(i) forwarding available user information from the merchant's computer to a credit reporting agency to evaluate the user for the one-time point-of-purchase loan in the case where the user is considered for the one-time point-of-purchase loan;

(j) performing a soft credit check of the available user information by a credit reporting agency processor, wherein the soft credit check comprises evaluating the available user information against at least one set of pre-screen criteria;

(k) performing a further credit check of the available user information by the credit reporting agency processor using a pre-established marketing model based on non-consumer specific data;

(l) determining, by the credit reporting agency processor, whether the user qualifies for the one-time point-of-purchase loan based on said soft credit check and said further credit check;

wherein if it is determined that the user does qualify for the one-time point-of-purchase loan the method further comprises:

(1) forwarding an indication from the credit reporting agency processor to the merchant's computer that the user qualifies for the one-time point-of-purchase loan;

(2) the merchant computer selecting an appropriate one-time point-of-purchase loan from among a set of pre-established one-time point-of-purchase loans;

(3) the merchant offering the user the selected appropriate one-time point-of-purchase loan via a different electronic communication medium; and (4) the user accepting the one-time point-of-purchase loan to complete the point-of-purchase transaction.

2. The method according to claim 1, wherein steps (a) through (l) are performed in real-time.

3. The method according to claim 1, wherein said user's request is declined during the point-of-purchase transaction as a result of an insufficient value associated with said user's pre-paid card, an incorrect credit card entry, atypical spending on the credit card or an enforcement of a credit limit on the credit card.

4. The method according to claim 1, wherein said at least one set of pre-screen criteria is constructed at a pre-operational stage.

5. The method according to claim 1, wherein said at least one set of pre-screen criteria defines certain levels of qualification for making one-time point-of-purchase loans.

6. The method according to claim 1, wherein said at least one set of pre-screen criteria is hierarchically organized, wherein said hierarchy ranges from a most stringent set of pre-screen criteria to a least stringent set of pre-screen criteria.

7. The method according to claim 6, wherein said step (j) of performing a soft credit check of the available user information by a credit reporting agency processor, further comprises: sequentially evaluating said user's credit worthiness against said at least one set of pre-screen criteria utilizing said hierarchical order until a particular set of pre-screen criteria is satisfied or it is determined that the user does not qualify for the one-time point-of-purchase loan.

8. The method according to claim 1, wherein said pre-established marketing model is constructed at a pre-operational stage.

9. The method according to claim 1, wherein said step (k) of performing a further credit check of the available user information by the credit reporting agency processor using a pre-established marketing model based on non-consumer specific data, further comprises: utilizing said pre-established marketing model as a pre-filter to utilizing said at least one set of pre-screen criteria.

10. The method according to claim 1, wherein said step (k) of performing a further credit check of the available user information by the credit reporting agency processor using a pre-established marketing model based on non-consumer specific data, further comprises: utilizing said pre-established marketing model simultaneous with utilizing said at least one set of pre-screen criteria.

11. The method according to claim 1, wherein said available user information forwarded to said credit reporting agency comprises at least one of: a name, an address, a billing and shipping address, a phone number, a social security number, an e-mail address, an amount of the declined purchase, and user purchase history data.

12. The method according to claim 1, wherein the point-of-purchase transaction is conducted either electronically over a network or at a retail outlet.

13. A point-of-purchase loan facilitator system for facilitating a loan offer to a user in response to a failed point-of-purchase transaction with a merchant, the system comprising:
at least one server configured to provide information exchange between the user, the merchant, a primary payment processor, and a credit reporting agency via an electronic communication medium,
wherein said information exchange includes, in the case where the merchant decides to consider the user for a one-time point-of-purchase loan after the point-of-purchase transaction has been declined by the payment processor and after the user has abandoned the point of purchase transaction, receiving available user information from the merchant and forwarding the available user information to the credit reporting agency to evaluate the user for a one-time point-of-purchase loan via a loan analysis module;
wherein said information exchange further includes receiving from said credit reporting agency a result of said loan analysis module based on a soft credit check which evaluates the available user information against at least one set of pre-screen criteria and a further credit check which evaluates the available user information using a pre-established marketing model based on non-consumer specific data the result indicating that the user qualifies for the one-time point-of-purchase loan and forwarding the result to the merchant;
wherein said information exchange further includes collaborating with the merchant to select an appropriate one-time point-of-purchase loan from among a set of pre-established one-time point-of-purchase loans
said at least one server further comprising a loan offer module configured to offer the user an option to qualify for a selected one-time point-of-purchase loan to complete an incomplete point-of-purchase transaction wherein said offer is made to the user via a different electronic communication medium.

14. A point-of-purchase loan facilitator system, according to claim 13, said at least one server further comprising:
a pre-screen criteria creation module configured to create the at least one set of pre-screen criteria that define certain levels of qualification for making the one-time point-of-purchase consumer loan to said user; and
a marketing model creation module configured to evaluate users for credit-worthiness based upon non-consumer specific data.

15. A point-of-purchase loan facilitator system according to claim 13, further comprising at least one database including information related to one or more of: said user's attempted purchase, decline codes, past declined purchases, purchases that have been contested by a purchaser and user identifications who have defaulted on store credit in the past.

16. A computer readable medium comprising computer executable instructions stored thereon for:
(a) receiving at a merchant computer via an electronic communication medium a primary payment option as a request from a user to complete a point-of-purchase transaction;
(b) forwarding from the merchant's computer to a payment processor the user's request to complete the point-of-purchase transaction;
(c) evaluating the user's request at the payment processor to determine whether the user's request is accepted or declined;
(d) determining by the payment processor that the user's request to complete the point-of-purchase transaction is declined;
(e) receiving at the merchant's computer a decline notification from the payment processor indicating that the user's request to complete the point-of-purchase transaction has been declined;
(f) the merchant informing the user that the point-of-purchase transaction has been declined;
(g) the user abandoning the point-of-purchase transaction;
(h) determining, by the merchant's computer, whether to consider the user for a one-time point-of-purchase loan;
(i) forwarding available user information from the merchant's computer to a credit reporting agency to evaluate the user for the one-time point-of-purchase loan in the case where the user is considered for the one-time point-of-purchase loan;

(j) performing a soft credit check of the available user information by a credit reporting agency processor, wherein the soft credit check comprises evaluating the available user information against at least one set of pre-screen criteria;

(k) performing a further credit check of the available user information by the credit reporting agency processor using a pre-established marketing model based on non-consumer specific data;

(l) determining, by the credit reporting agency processor, whether the user qualifies for the one-time point-of-purchase loan based on said soft credit check and said further credit check;

wherein if it is determined that the user does qualify for the one-time point-of-purchase loan the computer readable medium comprises further computer executable instructions for:

(1) forwarding an indication from the credit reporting agency processor to the merchant's computer that the user qualifies for the one-time point-of-purchase loan;

(2) the merchant computer selecting an appropriate one-time point-of-purchase loan from among a set of pre-established one-time point-of-purchase loans;

(3) the merchant offering the user the selected appropriate one-time point-of-purchase loan via a different electronic communication medium; and (4) the user accepting the one-time point-of-purchase loan to complete the point-of-purchase transaction.

* * * * *